United States Patent
Fu

(10) Patent No.: US 11,457,389 B2
(45) Date of Patent: Sep. 27, 2022

(54) CELL SELECTION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/459,778

(22) Filed: Aug. 27, 2021

(65) Prior Publication Data
US 2021/0410033 A1 Dec. 30, 2021

Related U.S. Application Data

(63) Continuation of application No. PCT/CN2019/102363, filed on Aug. 23, 2019.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0061* (2013.01); *H04W 48/20* (2013.01); *H04W 84/042* (2013.01)

(58) Field of Classification Search
CPC . H04W 36/08; H04W 36/0061; H04W 48/20; H04W 84/042
See application file for complete search history.

(56) References Cited

U.S. PATENT DOCUMENTS

| 8,750,870 B2 * | 6/2014 | Palanki | H04W 64/00 455/435.1 |
| 2020/0329422 A1 * | 10/2020 | Sirotkin | H04W 24/02 |

(Continued)

FOREIGN PATENT DOCUMENTS

| CN | 102065495 A | 5/2011 |
| CN | 103024848 A | 4/2013 |

(Continued)

OTHER PUBLICATIONS

International Search Report issued in corresponding International Application No. PCT/CN2019/102363, dated May 21, 2020, 29 pages.

(Continued)

*Primary Examiner* — Marisol Figueroa
(74) *Attorney, Agent, or Firm* — Bayes PLLC

(57) ABSTRACT

The embodiments of the present disclosure relate to a cell selection method, a terminal device and a network device. The method includes obtaining, by a terminal device, an identifier of at least one cell corresponding to a network type supported by the terminal device; and determining, by the terminal device according to the identifier of the at least one cell, a target cell for cell selection or cell reselection. The network type is at least one of a Closed Access Group (CAG) network or a Stand-alone Non-Public Network (SNPN) network. The identifier of the at least one cell is an identifier of the CAG network or is an identifier of the SNPN network.

8 Claims, 4 Drawing Sheets

200

A terminal device obtains an identifier of at least one cell and/or at least one frequency point corresponding to a network type supported by the terminal device — 210

The terminal device determines a target cell for cell selection or cell reselection according to the identifier of the at least one cell and/or the at least one frequency point — 220

(51) Int. Cl.
*H04W 48/20* (2009.01)
*H04W 84/04* (2009.01)

(56) References Cited

U.S. PATENT DOCUMENTS

| | | | | |
|---|---|---|---|---|
| 2020/0396792 | A1* | 12/2020 | Tiwari | H04W 4/90 |
| 2021/0092725 | A1* | 3/2021 | Park | H04W 48/16 |
| 2021/0297937 | A1* | 9/2021 | Baek | H04W 76/11 |

FOREIGN PATENT DOCUMENTS

| | | |
|---|---|---|
| CN | 106465212 A | 2/2017 |
| CN | 106792931 A | 5/2017 |
| CN | 106792988 A | 5/2017 |

OTHER PUBLICATIONS

PCT Written Opinion of the International Searching Authority issued in corresponding International Application No. PCT/CN2019/102363, dated May 21, 2020, 7 pages.

"3rd Generation Partnership Project; Technical Specification Group Radio Access Network; NR; User Equipment (UE) procedures in Idle mode and RRC Inactive state (Release 16)", 3GPP TS 38.304 V16.3.0 (Dec. 2020), 37 pages.

"3rd Generation Partnership Project; Technical Specification Group Radio Access Network; NR; Radio Resource Control (RRC) protocol specification (Release 16)", 3GPP TS 38.331 V16.3.1 (Jan. 2021), 929 pages.

"Open issues for early measurement configuration", Agenda Item: 11.10.3, Source: Oppo, 3GPP TSG-RAN 2#106, R2-1905586, Reno, USA , Apr. 13-17, 2019, 6 pages.

Extended European Search Report issued in corresponding European Application No. 19943472.1, dated Mar. 9, 2022, 12 pages.

First Office action issued in corresponding India Application No. 202127038341, dated Mar. 30, 2022, 7 pages.

"Discussion on closed access groups", Agenda Item: 11.18, Source: Oppo, 3GPP TSG-RAN WG2 Meeting #107, R2-1909675, Prague, Czech, Aug. 26-Aug. 30, 2019, 3 pages.

"Discussion on stand-alone non-public networks", Agenda Item: 11.18, Source: Oppo, 3GPP TSG-RAN WG2 Meeting #107, R2-1909674, Prague, Czech, Aug. 26-Aug. 30, 2019, 3 pages.

"Consideration on public network integrated NPN", Agenda Item: 11.18, Source: CMCC, 3GPP TSG-RAN WG2 #107,, R2-1909471, Prague, Czech Republic, Aug. 26-30, 2019, 11 pages.

"Support Inactive for SNPN and CAG", Agenda Item: 11.18, Source: Huawei, HiSilicon, China Telecom, 3GPP TSG-RAN2 Meeting #107, R2-1910557, Prague, Czech Republic, Aug. 26-30, 2019, 3 pages.

"On Private Network Support for NG-RAN", Agenda Item: 16.1, Source: China Telecom; 3GPP TSG RAN WG3#105, R3-193832, Ljubljana, Slovenia, Aug. 26-30, 2019, 7 pages.

"Discussion on SNPN/CAG cell (re)selection", Agenda Item: 11.18, Source: vivo, 3GPP TSG-RAN WG2 Meeting #107, R2-1910012, Prague, Czech Republic, Aug. 26-30, 2019, 3 pages.

* cited by examiner

200

A terminal device obtains an identifier of at least one cell and/or at least one frequency point corresponding to a network type supported by the terminal device ⎯ 210

The terminal device determines a target cell for cell selection or cell reselection according to the identifier of the at least one cell and/or the at least one frequency point ⎯ 220

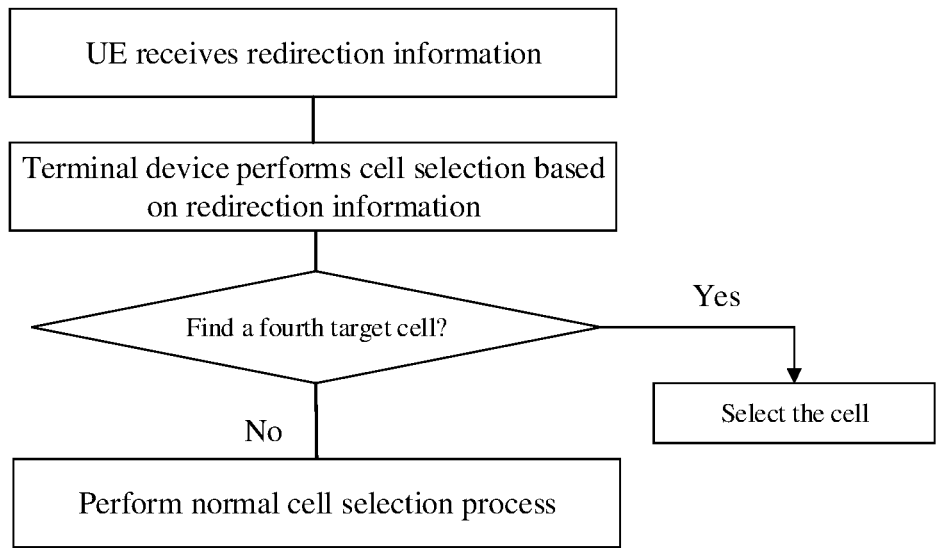
FIG. 4
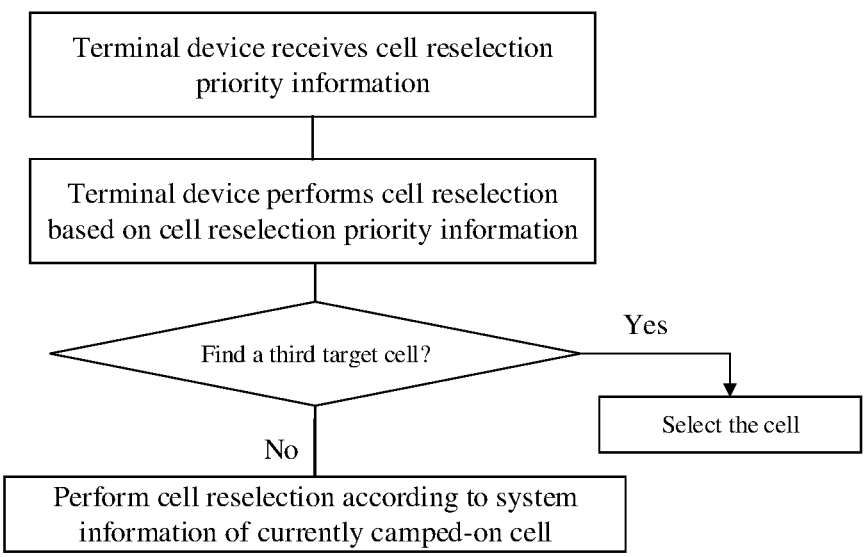
FIG. 5
300
A network device sends first information to a terminal device, where the first information is used to indicate an identifier of at least one cell and/or at least one frequency point corresponding to a network type supported by the terminal device — 310
FIG. 6

CELL SELECTION METHOD, TERMINAL DEVICE, AND NETWORK DEVICE

CROSS-REFERENCE TO RELATED APPLICATION

This application is a continuation of International Application No. PCT/CN2019/102363, filed on Aug. 23, 2019, the entire contents of which are incorporated herein by reference.

BACKGROUND

The embodiments of the present disclosure relate to the field of communications, and in particular to a cell selection method, a terminal device and a network device.

In a wireless communication system, a terminal device can perform cell selection or cell reselection operations. Currently, when performing the cell selection or cell reselection, the terminal device will only select a cell strongest in a frequency point.

However, the cell supported by the terminal device may not be the strongest cell on the frequency point, and thus the terminal device may not be able to select a suitable cell, which will affect normal service transmission of the terminal device and further affect performance of the terminal device.

SUMMARY

The embodiments of the present disclosure provide a cell selection method, a terminal device and a network device.

In a first aspect, a cell selection method is provided, and the method includes obtaining, by a terminal device, an identifier of at least one cell and/or at least one frequency point corresponding to a network type supported by the terminal device; and determining, by the terminal device according to the identifier of the at least one cell and/or the at least one frequency point, a target cell for cell selection or cell reselection.

In a second aspect, a cell selection method is provided, and the method includes sending, by a network device, first information to a terminal device, where the first information is used to indicate an identifier of at least one cell and/or at least one frequency point corresponding to a network type supported by the terminal device.

In a third aspect, there is provided a terminal device which is configured to perform the method in the above first aspect or the implementations thereof.

Specifically, the terminal device includes a functional module configured to perform the method in the above first aspect or the implementations thereof.

In a fourth aspect, there is provided a network device configured to perform the method in the above second aspect or the implementations thereof.

Specifically, the network device includes a functional module configured to perform the method in the above second aspect or the implementations thereof.

In a fifth aspect, there is provided a terminal device including a processor and a memory. The memory is used for storing a computer program, and the processor is configured to call and run the computer program stored in the memory to perform the method in the above first aspect or the implementations thereof.

In a sixth aspect, there is provided a network device including a processor and a memory. The memory is used for storing a computer program, and the processor is configured to call and run the computer program stored in the memory to perform the method in the above second aspect or the implementations thereof.

In a seventh aspect, there is provided an apparatus which is used to carry out the method in any one of the above first to second aspects or the implementations thereof.

Specifically, the apparatus includes a processor configured to call and run a computer program from a memory, to cause a device installed with the apparatus to perform the method in any one of the above first to the second aspects or the implementations thereof.

Optionally, the apparatus is a chip.

In an eighth aspect, there is provided a computer-readable storage medium for storing a computer program that causes a computer to perform the method in any one of the above first to the second aspects or the implementations thereof.

In a ninth aspect, there is provided a computer program product including computer program instructions that cause a computer to perform the method in any one of the above first to the second aspects or the implementations thereof.

In a tenth aspect, there is provided a computer program which, when running on a computer, causes the computer to perform the method in any one of the above first to the second aspects or the implementations thereof.

BRIEF DESCRIPTION OF THE DRAWINGS

FIG. 4 is a schematic flowchart of another specific implementation of a cell selection method according to an embodiment of the present disclosure.

FIG. 5 is a schematic flowchart of another specific implementation of a cell selection method according to an embodiment of the present disclosure.

FIG. 6 is a schematic diagram of another cell selection method according to an embodiment of the present disclosure.

DETAILED DESCRIPTION

The technical solutions in the embodiments of the present disclosure will be described below in conjunction with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Figures 1, 2:
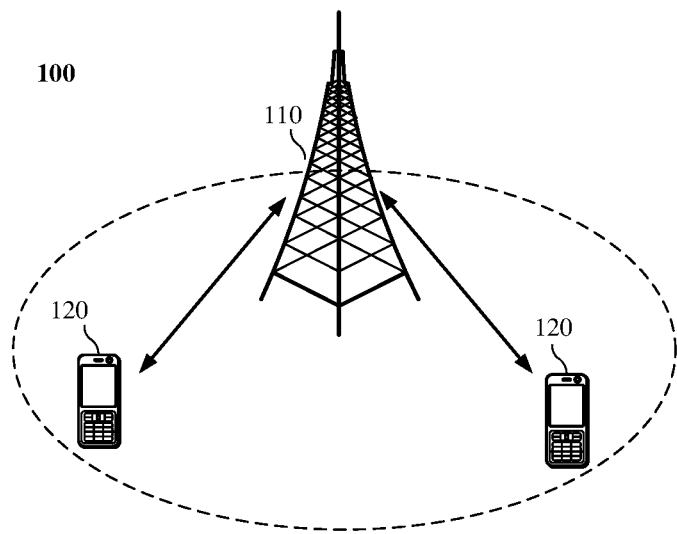
FIG. 1 is a schematic diagram of an architecture of a communication system according to an embodiment of the present disclosure.
FIG. 2 is a schematic diagram of a cell selection method according to an embodiment of the present disclosure.

For example, a communication system to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one terminal device 120 located within the coverage range of the network device 110. As used herein, the terminal device includes, but is not limited to, a device configured to receive/send communication signals and/or an Internet of Things (IoT) device, which may be connected with another device via a wired line, such as a Public Switched Telephone Network (PSTN), a Digital Subscriber Line (DSL), a digital cable, and direct cable connection; and/or via another data connection/network; and/or via a wireless interface, such as a cellular network, a wireless local area network (WLAN), a digital TV network such as a DVB-H network, a satellite network or a AM-FM broadcast transmitter. A terminal device configured to communicate through a wireless interface may be referred to as a "wireless communication terminal", a "wireless terminal" or a "mobile terminal". Examples of the mobile terminal include but are not limited to a satellite or cellular phone; a Personal Communications System (PCS) terminal that can combine cellular radio phones with data processing, fax, and data communication capabilities; a PDA that may include a radio phones, pager, Internet/intranet access, Web browser, memo pad, calendar, and/or Global Positioning System (GPS) receiver; and a conventional laptop and/or palmtop receiver or other electronic devices including a radio telephone transceiver. The terminal device may refer to an access terminal, user equipment (UE), a user unit, a user station, a mobile station, a mobile site, a remote station, a remote terminal, mobile equipment, a user terminal, a terminal, wireless communication equipment, a user agent, or a user device. The access terminal may be a cellular phone, a cordless phone, a Session Initiation Protocol (SIP) phone, a wireless local loop (WLL) station, a personal digital assistant (PDA), and a wireless communication functional handheld device, a computing device or other processing devices connected to a wireless modem, an in-vehicle device, a wearable device, a terminal device in a 5G network, a terminal device in future evolved PLMN, or the like.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein.

In the current cell selection and cell reselection process, a Radio Resource Control connection release message can carry redirection information, and the redirection information can include a redirected Radio Access Technology (RAT) and frequency point information. When the terminal device leaves the connected state, if the terminal device fails to find a suitable cell according to the redirection information, the terminal device performs the cell selection process. In the cell selection process, if the terminal device has cell selection information saved, the terminal device can search for a suitable cell on the saved frequency point. If a cell is found, the terminal device selects this cell to camp on.

If there is no suitable cell, the terminal device performs an initial cell selection process, that is, the terminal device sweeps all supported NR bands, and for each frequency point, the terminal device searches for only a strongest cell on this frequency point. If the cell is found, the terminal device can select this cell to camp on, otherwise, the terminal device enters an Any Cell Selection state.

In the Any Cell Selection state, the terminal device performs the cell selection process to find a suitable cell. If the terminal device does not find the suitable cell after searching on all frequency points of all supported RATs, the terminal device can attempt to find an acceptable cell on any RAT to camp on. If the UE finds the acceptable cell, the terminal device enters a Camped on Any Cell state, otherwise the terminal device stays in the Any Cell Selection state.

After entering the Camped on Any Cell state, the terminal device can read system information of the camped-on cell, perform cell reselection related measurements, and perform a cell reselection evaluation process. When the cell reselection evaluation condition is satisfied, the terminal device can perform the cell reselection. At the same time, the terminal device can regularly attempt to search for a suitable cell on all frequency points of all supported RATs.

Specifically, in the above cell selection process, for each frequency point, terminal device searches for only the strongest cell to find a suitable cell.

In the above cell reselection process, when reselecting a frequency point with a different priority from the current NR frequency point, the terminal device can select a strongest cell on this frequency point; and when reselecting a frequency point with a same priority as the current NR frequency point, the terminal device can select a most suitable cell from at least one strongest cell on the frequency point. For example, the terminal device can select the cell with a largest number of beams greater than a threshold as the suitable cell.

It can be seen from the above that when the terminal device performs the cell selection or cell reselection, the terminal device will select only the strongest cell on the frequency point. However, in some scenarios, such as a Non-Public Network (NPN), the cell supported by the terminal device may not be the strongest cell on this frequency point, and the terminal device may not be able to camp on or select a suitable cell, and thus the terminal device can only select an acceptable cell.

The NPN network is introduced below in brief. The NPN network includes a Public Network Integrated NPN (PNI-NPN) network and a Stand-alone Non-Public Network (SNPN) network.

The PNI-NPN network is a private network supporting a private use of a Public Land Mobile Network (PLMN), that is, using the public PLMN to provide private network services.

The SNPN is a private network that is not a 3GPP public network, that is, a specific entity, such as a factory operator, uses the private network to reserve the PLMN for private network services. The PNI-NPN is also called a Closed Access Group (CAG).

If the cell on which the terminal device camps is a suitable cell, the terminal device can perform normal data transmission. However, if the cell on which the terminal device camps is an acceptable cell, only limited services such as emergency calls, receiving earthquake and tsunami warnings, etc. can be supported in this cell. The terminal device cannot perform normal service transmission in the acceptable cell, which will affect the performance and experience of the terminal device.

In order to enable the terminal device to camp on or select a suitable cell, an embodiment of the present disclosure proposes a cell selection method, which enables the terminal device to camp on or select a suitable cell, thereby improving the performance and experience of the terminal device.

FIG. 2 is a schematic flowchart of a cell selection method 200 according to an embodiment of the present disclosure. The method shown in FIG. 2 can be performed by a terminal device, and the terminal device may be, for example, the terminal device 120 shown in FIG. 1. As shown in FIG. 2, the method 200 may include at least part of the following content.

In 210, the terminal device obtains an identifier of at least one cell and/or at least one frequency point corresponding to a network type supported by the terminal device.

In 220, the terminal device determines a target cell for cell selection or cell reselection according to the identifier of the at least one cell and/or the at least one frequency point. The target cell is the suitable cell as mentioned above.

The method 200 can be applied in the NPN scenario. In this scenario, the network type can be a CAG network and/or an SNPN network, and an access mode of the terminal device can be a CAG access mode and/or an SNPN access mode.

When the access mode of the terminal device is a CAG-only mode, that is, when the terminal device is a terminal device that only supports CAG, the network type supported by the terminal device is the CAG network, and the unsupported network type is the SNPN network and the public network. The terminal device that only supports CAG can only access the CAG cell. Further, the terminal device that only supports CAG can only access the CAG cell that it is configured or pre-configured for the terminal device and that allows the terminal device to access.

When the access mode of the terminal device is a SNPN-only mode, that is, when the terminal device is a terminal device that only supports SNPN, the network type supported by the terminal device is the SNPN network, and the unsupported network types are the public network and the CAG network. The terminal device that only supports the SNPN can only access the SNPN cell. Further, the terminal device that only supports the SNPN can only access the SNPN cell that it is configured or pre-configured for the terminal device and that allows the terminal device to access.

Optionally, the access mode of the terminal device may be pre-configured or may be configured by the network device.

When the method 200 is applied in the NPN scenario, optionally, the identifier of the at least one cell and/or the at least one frequency point may be an identifier of the CAG network.

Optionally, the identifier of the at least one cell and/or the at least one frequency point may be an identifier of the SNPN network.

Optionally, the identifier of the CAG network may be at least one of the following: a PLMN+CAG identifier, a PLMN+Network ID (NID) identifier, and indication for indicating the identifier of the CAG network.

The identifier of the SNPN network may be at least one of the following: a PLMN+SNPN identifier, a PLMN+NID identifier, and indication for indicating the identifier of the SNPN network.

For the SNPN scenario, the terminal device set in the SNPN access mode can obtain an available PLMN and an available NDI list, and the terminal device can select and access the cell corresponding to the supported PLMN+NDI. When the terminal device is initially registered in the SNPN, the terminal device can provide the selected PLMN+NDI to the network device.

Optionally, the terminal device may be a terminal device in a connected state, a terminal device in an idle state, or a terminal device in an inactive state, which is not particularly limited in the embodiments of the present disclosure.

It should be understood that the term "and/or" used herein is merely to describe relative relationships of relative objects, indicating that there can be three kinds of relationships. For example, A and/or B can indicate three cases where A exists alone, A and B exist simultaneously, or B exists alone.

Hereinafter, the technical solutions of the embodiments of the present disclosure will be described in detail with reference to four embodiments. It should be noted that, in order to describe the solutions, in the following embodiments, the CAG network will be taken as an example of the network type and the terminal device being in the idle state will be taken as an example for description, but the embodiments of the present disclosure are not limited thereto.

Embodiment 1. The terminal device obtains an identifier of at least one CAG cell and/or at least one CAG frequency point that it has accessed before and/or it has attempted to access before.

In an implementation, the terminal device may obtain the identifier of the at least one CAG cell and/or the at least one CAG frequency point that it has accessed before and/or it has attempted to access before, according to saved information.

Optionally, the terminal device may obtain the saved information through system information or dedicated signaling. Exemplarily, the dedicated signaling may carry redirection information or cell reselection priority information in a Radio Resource Control (RRC) connection release message.

For example, when the terminal device is in a cell that it has accessed before, it can determine whether the cell is a CAG cell by reading the system information of the cell. If the cell is the CAG cell, the terminal device can save the identifier of the cell. Then, the terminal device can determine the identifier of the cell according to the saved information.

Optionally, the saved information may include at least one of the following information: an index of the at least one frequency point, a Physical Cell Identity (PCI) range corresponding to the at least one frequency point, at least one PCI identifier corresponding to the at least one frequency point and at least one CAG identifier, where the PCI identifier may be a PCI index.

Exemplarily, if the PCI value is continuous, the saved information can include the PCI range or the identifier of each PCI; and if the PCI value is not continuous, the saved information can include the identifier of each PCI.

After the terminal device obtains the identifier of the at least one CAG cell and/or the identifier of the CAG frequency point, the terminal device can determine the target cell according to the identifier of the at least one CAG cell and/or the identifier of the CAG frequency point (for ease of description, the target cell in Embodiment 1 is referred to as a first target cell).

In the CAG scenario, the terminal device that supports only the CAG can only access the cells and/or frequency points in an allowed CAG list. Therefore, in an implementation, the terminal device may search for at least one CAG cell and/or at least one CAG frequency point. If the terminal device finds a cell/cells by searching, and the terminal device matches the identifier/identifiers of at least part of the found cell/cells with cell identifiers in the allowed CAG list, the terminal device may determine a cell that is successfully matched as the first target cell.

The terminal device may match the identifier of the found cell with a cell identifier in the allowed CAG list, and the terminal device may determine the cell that is successfully matched as the first target cell.

The allowed CAG list may be pre-set on the terminal device.

If there are multiple successfully matched cells, as an example, the terminal device may randomly select a cell from the multiple successfully matched cells as the first target cell.

As another example, the terminal device may determine the cell with the strongest signal strength among the multiple successfully matched cells as the first target cell.

Optionally, the terminal device may determine the signal strength of the cell according to reference signal received power (RSRP) and/or reference signal receiving quality (RSRQ).

As another example, the terminal device may determine the cell that is first found among the multiple successfully matched cells as the first target cell.

As another example, the terminal device may determine a cell with a number of beams greater than a threshold among the multiple successfully matched cells as the first target cell.

Optionally, the threshold may be preset on the terminal device based on a protocol, or may be pre-configured for the terminal device by the network device, for example, it may be configured through RRC signaling.

In another implementation, the terminal device may first match the identifier of the at least one CAG cell and/or the identifier of the at least one CAG frequency point with the identifiers of the cells and/or frequency points in the allowed CAG list. And then, the terminal device searches for the successfully matched CAG cell and/or CAG frequency point, and determines the cell found by searching as the first target cell.

Embodiment 2. The terminal device may obtain the identifier of the at least one CAG cell and/or the identifier of the at least one CAG frequency point through system information broadcast by the CAG cell.

Optionally, the system information may include at least one of the following information: an index of the at least one CAG frequency point, a PCI range corresponding to the at least one CAG frequency point, a PCI identifier corresponding to the at least one CAG frequency point, an identifier of the at least one CAG, and an identifier of the at least one CAG frequency point.

The CAG frequency point may be a CAG frequency point of the current frequency point, and the PCI or PCI range corresponding to the CAG frequency point may be a PCI or PCI range of the CAG cells supported by the current frequency point. At this time, the system information can be carried in System Information Block 3 (SIB3).

The CAG frequency point may also be a CAG frequency point of an inter-frequency point, and the PCI or PCI range corresponding to the CAG frequency point may be a PCI or PCI range of the CAG cells supported by an adjacent frequency point. At this time, the system information can be carried in SIB4 or other information.

After the terminal device obtains the identifier of the at least one CAG cell and/or the identifier of the at least one CAG frequency point, the terminal device may determine the target cell according to the identifier of the at least one CAG cell and/or the identifier of the at least one CAG frequency point.

In an implementation, for each frequency point in at least one CAG frequency point, the terminal device can search for cells on the frequency point according to signal strength of the cells, that is, the terminal device can search for the cells according to ranking of the signal strength of the cells.

There are two manners for the terminal device to search for the cells according to the ranking of the signal strength of the cells, which will be introduced respectively below.

Manner 1. In a possible embodiment, the terminal device may first search for the cell with the strongest signal strength on the frequency point. If the cell with the strongest signal strength is found by searching, the terminal device obtains the CAG identifier of the cell by reading the system information of the cell with the strongest signal strength. After that, the terminal device matches the CAG identifier of the cell with the strongest signal strength with a cell identifier in the allowed CAG list. If the matching succeeds, the terminal device can determine the cell with the strongest signal strength as a second target cell.

If the terminal device does not find the cell with the strongest signal strength or the terminal finds the cell with the strongest signal strength but the cell is not a cell in the allowed CAG list, the terminal device can continue to search for the cell with second strongest signal strength on the frequency point. If the cell with the second strongest signal strength is found by searching, the terminal device obtains the CAG identifier of the cell with the second strongest signal strength by reading the system information of the cell with the second strongest signal strength, and then matches the CAG identifier of the cell with the second strongest signal strength with a cell identifier in the allowed CAG list. If the matching is successful, the terminal device may determine the cell with the second strongest signal strength as the second target cell.

Otherwise, the terminal device continues to search for the cell on the frequency point, and so on.

If none of the cells on this frequency point can be used as the second target cell, the terminal device can continue to search a next frequency point, and so on.

In another possible embodiment, the terminal device can read the system information of all cells on the frequency point to obtain the CAG identifiers of all the cells on the frequency point, and then match the CAG identifiers of all the cells on the frequency point with the cell identifiers in the allowed CAG list. After that, the terminal device sequentially searches for the successfully matched cells according to the signal strength of the cells. If a cell is found by searching, the terminal device determines the found cell as the second target cell.

Regarding an order in which the terminal device searches the frequency points, as an example, the terminal device may randomly select the order in which the frequency points are searched.

As another example, the terminal device may search the frequency points according to a priority order of the frequency points. For example, the terminal device may search the frequency points in the order from high priority to low priority, or the terminal device may search the frequency points in the order from low priority to high priority.

As another example, the terminal device may search the frequency points according to the order in which the frequency points are obtained by frequency sweeping.

Manner 2. The terminal device may obtain the identifier of at least one CAG cell and/or CAG according to the PCI range and/or adjacent frequency information.

Specifically, the terminal device may first search for the cell with the strongest signal strength on the frequency point. If the cell with the strongest signal strength is found by searching, the terminal device obtains the CAG information of the cell with the strongest signal strength by reading the system information of the cell with the strongest signal strength, and the terminal device matches the CAG identifier of the cell with the strongest signal strength with a cell identifier in the allowed CAG list. If the match is successful, the terminal device can determine the cell as the second target cell.

If the terminal device does not find the cell with the strongest signal strength, or the terminal device find the cell with the strongest signal strength but the cell is not a cell in the allowed CAG list, since the PCI range given in the system information may be a range for all terminal devices, it is necessary for each terminal device to make further selection based on the PCI range.

The terminal device can determine a range of the cells that support the CAG on the frequency point according to the PCI range of corresponding CAG cells in the system information (such as SIB3). The terminal device searches for the cell within the range of the cells. If a cell is found, the terminal device obtains the CAG identifier of the cell by reading the system information of the cell, then the terminal device matches the CAG identifier of the cell with a cell identifier in the allowed CAG list, and if the matching is successful, the terminal device selects the cell as the second target cell.

Alternatively, the terminal device may first obtain the CAG identifiers of all cells within the range of the cells, and match the CAG identifiers of all the cells with the cell identifiers in the allowed CAG list, and then the terminal device searches for the successfully matched cells to obtain the second target cell.

If the terminal device fails to determine the second target cell, the terminal device can determine the range of the cells that support the CAG on the frequency point according to the PCI range of the CAG cells corresponding to the inter-frequency given in the system information (such as SIB4). After the terminal device determines the range of the cells, the terminal device can determine the second target cell within the range of the cells.

If the terminal device still fails to determine the second target cell, the terminal device can continue to search the next frequency point.

In another implementation, the terminal device can sweep all supported NR bands. The frequency points obtained by the frequency sweeping may not all be the CAG frequency points. Therefore, the terminal device can first perform frequency filtering on the frequency points obtained by the frequency sweeping to select the CAG frequency points. After that, the terminal device searches for the cell on each frequency point of the selected CAG frequency points. For subsequent behaviors of the terminal device, reference can be made to the description in the previous implementation, which will not be repeated here for the sake of brevity.

In another implementation, the terminal device may sequentially sweep all supported NR bands, and the frequency points obtained by the frequency sweeping may not all be the CAG frequency points or the frequency points supported by itself. Therefore, for each frequency point, the terminal device can perform filtering on the frequency points obtained by the frequency sweeping to determine whether it is a CAG frequency point or whether it is a CAG frequency point supported by itself. If so, the terminal device can perform further cell selection or search on this frequency point. If not, the terminal device can perform frequency sweeping or search on the next frequency point. For the subsequent cell selection or search behavior of the terminal device, reference can be made to the description in the previous implementation, which will not be repeated here for the sake of brevity.

In another implementation, the terminal device may determine a third target cell based on a priority order of priority of the at least one frequency point and priority of a frequency point of a currently camped-on cell, and according to the identifier of the at least one CAG cell and/or the identifier of the CAG frequency point.

If the priority of a target frequency point in at least one frequency point is the same as the priority of the frequency point of the currently camped-on cell, as an example, the terminal device can select a number of N cells with the strongest signal strength from among the cells on the target frequency point according to the signal strength of the cells. Then, the terminal device determines the CAG identifiers of the N cells by reading the system information of the N cells, and then matches the CAG identifiers of the N cells with the cell identifiers in the allowed CAG list, and the successfully matched cell can be used as the third target cell. N is a positive integer.

Optionally, N may be a pre-configured and fixed value, or a value configured by the network, or a value determined by the terminal device itself.

Optionally, N may be the number of cells with signal strength greater than a threshold. In this case, the number of N cells selected by the terminal device each time may be different.

If there are multiple cells that are successfully matched, for the implementation manner for the terminal device to determine the third target cell, reference can be made to the description of the foregoing content. For example, the terminal device may randomly select a cell among the multiple successfully matched cells as the third target cell; or the terminal device may determine the cell with the strongest signal strength among the multiple successfully matched cells as the third target cell; or the terminal device may determine the cell with the number of beams greater than the threshold among the multiple successfully matched cells as the third target cell.

As another example, the terminal device can read the CAG identifiers of all cells on the target frequency point and match the CAG identifiers of all the cells with the cell identifiers in the allowed CAG list. Next, the terminal device can select the third target cell among the cells that have been successfully matched.

For example, the terminal device may randomly select a cell in the cells that are successfully matched, as the third target cell.

For another example, the terminal device may determine, according to the signal strength of the cells, the cell with the strongest signal strength among the successfully matched cells as the third target cell.

For another example, the terminal device may select the third target cell according to the number of beams of the cells.

If the priority of the target frequency point is higher than or equal to the priority of the frequency point of the currently camped-on cell, the terminal device can determine a cell on the target frequency point or a cell in the cells on the target frequency point, which has the signal strength greater than the threshold and the CAG cell identifier of which matches a cell identifier in the allowed CAG list, as the third target cell.

If the priority of the target frequency point is lower than the priority of the frequency point of the currently camped-on cell, and the signal strength of the currently camped-on cell is less than the threshold, the terminal device can determine a cell on the target frequency point or a cell in the cells on the target frequency point which has the signal strength greater than the threshold and the CAG cell identifier of which matches a cell identifier in the allowed CAG list, as the third target cell.

Figure 3:
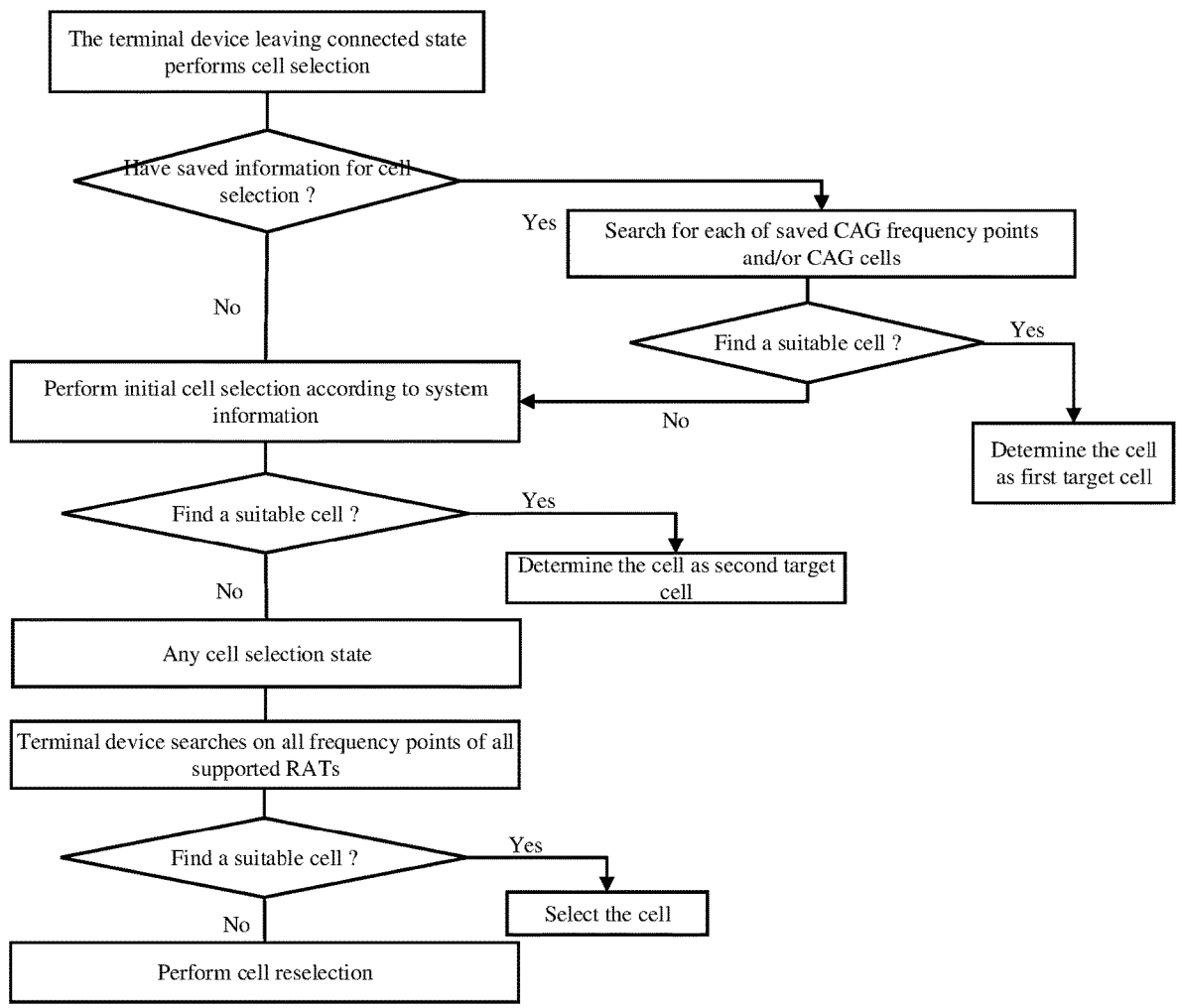
FIG. 3 is a schematic flowchart of a specific implementation of a cell selection method according to an embodiment of the present disclosure.

For better understanding of the solution of Embodiment 2, a specific implementation of Embodiment 2 will be described below with reference to FIG. 3.

After the terminal device leaves the connected state, the cell selection is performed. In step 1, if the terminal device has saved information for the cell selection, the terminal device first searches the saved CAG cell and/or CAG frequency point. If the terminal device can find a suitable cell by searching, the terminal device can determine the found cell as the first target cell. For the specific implementation of step 1, reference may be made to the description of Embodiment 1.

In the case that the terminal device fails to determine the first target cell, the terminal device performs step 2, that is, the initial cell selection process. Specifically, the terminal device can sweep all supported NR bands, and then, for each frequency point, the terminal device performs the initial cell selection process according to the system information. If the terminal device can find a suitable cell by searching, the terminal device can determine the found cell as the second target cell. For the specific implementation of step 2, reference may be made to the related descriptions of manner 1 and manner 2 in Embodiment 2.

In the case that the terminal device fails to determine the second target cell, the terminal device performs step 3, that is, the terminal device enters an Any Cell Selection state. In the Any Cell Selection state, the terminal device performs the cell selection process to find a suitable cell.

In step 3, the cell selection process performed by the terminal device can be an existing cell selection process. For example, the terminal device searches all frequency points of all supported RATs. If the terminal device finds a suitable cell by searching, the terminal device can select the cell as the target cell. If the terminal device does not find a suitable cell by searching after searching on all frequency points of all RATs of the supported RATs, the terminal device can find an acceptable cell on any RAT to camp on.

Or, the terminal device can search for a suitable cell in the manner in step 2.

If the terminal device does not find a suitable cell, that is, the terminal device fails to determine the target cell, the terminal device enters a camped on any cell state. In this state, the terminal device can perform the cell reselection process.

Specifically, the terminal device can read the system information of the cell currently camped on, and perform cell reselection related measurement and cell reselection evaluation process. The UE performs the cell reselection when a cell reselection rule is met.

It should be understood that in the embodiments of the present disclosure the cell reselection related measurement and cell reselection evaluation process can be performed according to any existing technology, which is not limited in the embodiments of the present disclosure.

For the cell reselection process, reference can be made to the related description in Embodiment 2. For example, if the priority of the frequency point reselected by the terminal device is the same as the priority of the frequency point of the cell on which the terminal device currently camps, the terminal device can select N cells with the strongest signal strength among the cells on the reselected frequency point based on the signal strength of the cells. Then, the terminal device determines the CAG identifiers of the N cells by reading the system information of the N cells, and matches the CAG identifiers of the N cells with the cell identifiers in the allowed CAG list, and the successfully matched cell can be used as the third target cell.

Since the terminal device performs the cell reselection under certain conditions, the terminal device can perform the cell reselection only when the conditions are met, and thus the terminal device may miss the opportunity to select a suitable cell. In addition, even if the terminal device selects the suitable cell, the terminal device may be constantly moving, and the terminal device may enter an unsuitable cell during the movement. Therefore, further, the terminal device may also, for example, regularly, search all the frequency points of the supported RAT to find a suitable cell, that is, determining the target cell.

Embodiment 3. The terminal device may receive redirection information in the redirection process, and the redirection information may indicate the identifier of the at least one CAG cell and/or the identifier of the at least one CAG frequency point. The terminal device can obtain the identifier of the at least one CAG cell and/or the identifier of the at least one CAG frequency point through the redirection information.

Optionally, the redirection information may include at least one of the following identifiers: an index of the at least one CAG frequency point, a PCI identifier corresponding to each CAG frequency point in the at least one CAG frequency point, the identifier of the at least one CAG cell, and the identifier of the at least one frequency point. The identifier of the CAG cell may be a PLMN and CAG identifier. The PCI identifier may also be a PCI index or a PCI range.

Optionally, the redirection information may be carried in RRC dedicated signaling. For example, the RRC connection release message carries the redirection information.

In the process of the cell selection performed by the terminal device, the terminal device can search the PCI corresponding to each frequency point. If a cell is found by searching, the terminal device can determine the found cell as a fourth target cell.

The CAG frequency points in the redirection information may not all be the CAG frequency points supported by the terminal device. Therefore, after finding a cell, the terminal device can obtain the CAG identifier of the found cell through the redirection information, and the terminal device matches the CAG identifier of the found cell with a cell identifier in the allowed CAG list. If the matching is successful, the terminal device determines the found cell as the fourth target cell.

Alternatively, the terminal device may first match the CAG frequency points in the redirection information with the frequency points in the allowed CAG list, and then the terminal device searches the PCI corresponding to the frequency point that is successfully matched.

Alternatively, the terminal device may search for each cell on each CAG frequency point in at least one CAG frequency point. If the terminal device finds a cell by searching, and the identifier of the cell found by the terminal device matches a cell identifier in the allowed CAG list, the terminal device may determine the successfully matched cell as the fourth target cell.

Alternatively, the terminal device may match the identifier of each cell on each CAG frequency point in at least one CAG frequency point with a cell identifier in the allowed CAG list, and then the terminal device searches for the successfully matched cell. If the terminal device finds a cell, the terminal device may determine the found cell as the fourth target cell.

If the terminal device fails to determine the fourth target cell, the terminal device can perform a normal cell selection process, as shown in FIG. 4. For example, if the terminal device has saved information, the terminal device can determine the target cell on the saved cell and/or frequency point. If the target cell is not found, the terminal device performs the initial cell selection process. If the target cell is still not found, the terminal device enters the any cell selection state. If the target cell is still not found, the terminal device enters the camped on any selection state, and then the terminal device performs the cell reselection process.

When the terminal device performs the normal cell selection process, the terminal device can perform the cell selection process as described in the related descriptions of Embodiment 1 and Embodiment 2 in the foregoing, or the terminal device can also perform the cell selection process according to other methods, which is not particularly limited in the embodiments of the present disclosure.

Embodiment 4. The terminal device receives cell reselection priority information, where the cell reselection priority information may indicate the identifier of the at least one CAG cell and/or the identifier of the at least one CAG frequency point. The terminal device can obtain the identifier of the at least one CAG cell and/or the identifier of the at least one CAG frequency point through the cell reselection priority information.

Optionally, the cell reselection priority information may include but is not limited to at least one of the following identifiers: an index of at least one CAG frequency point, a PCI identifier corresponding to each CAG frequency point in the at least one CAG frequency point, an identifier of at least one CAG cell, and an identifier of at least one CAG frequency point. The identifier of CAG cell may be a PLMN and CAG identifier. The PCI identifier may also be a PCI index or a PCI range.

Optionally, the cell reselection priority information may be carried in RRC dedicated signaling. For example, the RRC connection release message can carry the cell reselection priority information. For example, each NR frequency point priority Information Element (IE) in a NR frequency point priority list (FreqPriorityListNR) may carry an index of at least one CAG frequency point and a PCI identifier corresponding to each CAG frequency point in the at least one CAG frequency point.

Optionally, the cell reselection priority information may also include the priority of each CAG frequency point in at least one CAG frequency point.

In the process of the cell selection performed by the terminal device, the terminal device can search the PCI corresponding to each frequency point. If a cell is found by searching and the cell meets the cell reselection rule, the terminal device can determine the found cell as the third target cell.

The CAG frequency points in the cell reselection priority information may not all be the CAG frequency points supported by the terminal device. Therefore, further, when the terminal device finds a cell and the found cell meets the cell reselection rule, the terminal device can obtain the CAG identifier of the found cell through the cell reselection priority information, and match the CAG identifier of the found cell with a cell identifier in the allowed CAG list. If the matching is successful, the terminal device determines the found cell as the third target cell.

Alternatively, the terminal device may first match the CAG frequency points in the cell redirection priority information with the frequency points in the allowed CAG list, and then the terminal device searches the PCI corresponding to the frequency point that is successfully matched.

Alternatively, the terminal device may search for each cell on each CAG frequency point in at least one CAG frequency point. If the terminal device finds a cell by searching, and the identifier of the cell found by the terminal device matches the cell identifier in the allowed CAG list, the terminal device may determine the successfully matched cell as the third target cell.

Alternatively, the terminal device may match the identifier of each of cells on each CAG frequency point in at least one CAG frequency point with the cell identifier in the allowed CAG list, and then the terminal device searches for the successfully matched cell. If the terminal device finds a cell by searching, the terminal device may determine the found cell as the third target cell.

If the terminal device fails to determine the third target cell, the terminal device can perform cell reselection according to the system information of the cell currently camped on, as shown in FIG. 5.

As an example, when the terminal device reselects a frequency point with a different priority from the frequency point of the currently camped-on cell, the terminal device can select a strongest cell on the frequency point; when the terminal device reselects a frequency point with the same priority as the frequency point of the currently camped-on cell, the terminal device can select a most suitable cell among at least one strongest cell on the frequency point. For example, the terminal device can select the cell with a largest number of beams greater than the threshold as the third target cell.

As another example, the terminal device may perform the cell reselection according to the related description in Embodiment 2, which will not be detailed for the sake of brevity.

When the terminal device transitions from the idle state to the connected state, if the terminal device accesses the 5G system (5GS) through the CAG cell, the terminal device can provide the identifier of the selected CAG to the network device, and the network device then provides the identifier of the cell selected by the terminal device to Access and Mobility Management Function (AMF).

It should be understood that although Embodiment 1 to Embodiment 4 are described above separately, it does not mean that Embodiment 1 to Embodiment 4 are independent, and the description of each embodiment may refer to each other. For example, the related description in Embodiment 2 can be applied to Embodiment 3 and Embodiment 4.

It should also be understood that part of contents in Embodiment 1 to Embodiment 4 can be combined with each other. For example, in Embodiment 1, the terminal device can determine the target cell based on the priority order of the priority of the at least one frequency point and the priority of the frequency point of the currently camped-on cell and according to the identifier of the at least one cell and/or the identifier of the at least one frequency point.

It should also be understood that in the embodiments of the present disclosure, the terms "first", "second", "third", and fourth are only used to distinguish different objects, but do not limit the scope of the embodiments of the present disclosure.

Generally, when the terminal device performs the cell selection or cell reselection, the target cell determined for the cell selection or cell reselection may be not a cell corresponding to the network type supported by the terminal device. In this case, the terminal device may not be able to perform normal service transmission in the selected cell. In the embodiments of the present disclosure, when the terminal device performs the cell selection or cell reselection, the target cell can be determined according to the obtained identifier of the cell and/or the frequency point corresponding to the supported network device type. In this way, the probability that the terminal device selects a suitable cell can be improved, so that the normal service transmission of the terminal device and the performance of the terminal device can be guaranteed.

The cell selection method according to the embodiments of the present disclosure has been described above in detail from the perspective of the terminal device in conjunction with FIGS. 2-5, and the cell selection method according to the embodiments of the present disclosure will be described below from the perspective of the network device in conjunction with FIG. 6.

FIG. 6 is a schematic flowchart of a cell selection method 300 according to an embodiment of the present disclosure. The method described in FIG. 6 may be performed by a network device, and the network device may be, for example, the network device 110 shown in FIG. 1. As shown in FIG. 6, the method 300 may include at least part of the following content.

In 310, the network device sends first information to a terminal device, where the first information is used to indicate an identifier of at least one cell and/or at least one frequency point corresponding to a network type supported by the terminal device.

Optionally, in an embodiment of the present disclosure, the network type is a CAG network and/or a SNPN network.

Optionally, in an embodiment of the present disclosure, the identifier of the at least one cell and/or the at least one frequency point is an identifier of the CAG network; and/or the identifier of the at least one cell and/or the at least one frequency point is an identifier of the SNPN network.

Optionally, in an embodiment of the present disclosure, the identifier of the CAG network may be at least one of the following: a PLMN and CAG identifier, a PLMN and NID identifier, and indication for indicating the identifier of the CAG network.

The identifier of the SNPN network may be at least one of the following: a PLMN and SNPN identifier, a PLMN and NID identifier, and indication for indicating the identifier of the SNPN network.

Optionally, in an embodiment of the present disclosure, the first information is system information.

Optionally, in an embodiment of the present disclosure, the system information includes at least one of the following information: an index of at least one frequency point, a PCI range corresponding to at least one frequency point, at least one PCI identifier corresponding to at least one frequency point, an identifier of at least one cell and an identifier of at least one frequency point.

Optionally, in an embodiment of the present disclosure, the first information is redirection information.

Optionally, in an embodiment of the present disclosure, the first information is cell reselection priority information.

Optionally, in an embodiment of the present disclosure, the cell reselection priority information further includes priority of each frequency point in the at least one frequency point.

Optionally, in an embodiment of the present disclosure, the first information includes at least one of the following identifiers: an index of at least one frequency point, a PCI identifier corresponding to each frequency point in the at least one frequency point, an identifier of at least one cell, and an identifier of at least one frequency point.

In an embodiment of the present disclosure, the network device may send at least one of the following information to the terminal device: system information, cell reselection priority information, and redirection information. For example, the network device may send the system information and/or the redirection information to the terminal device; for another example, the network device may send the system information and/or the cell reselection priority information to the terminal device.

It should be understood that when the network device sends at least one of the system information, the cell reselection priority information, and the redirection information to the terminal device, the sending order and sending conditions for sending at least one of the system information, the cell reselection priority information, and the reselection information by the network device is not limited in the embodiments of the disclosure.

For example, the network device may simultaneously send at least two of the system information, the cell reselection priority information, and the redirection information to the terminal device; or the network device may first send the system information and then send the redirection information.

For another example, the network device may send the system information to the terminal device, and in a case where the terminal device fails to determine the second target cell, the network device sends the cell reselection priority information to the terminal device; or the network device may send the system information to the terminal device in a case where the terminal device fails to determine the fourth target cell; or the network device may broadcast the system information regardless of whether the terminal device has selected the fourth target cell or not.

It should be understood that, for the implementation of the method 300, reference may be made to the method 200. Here, in order to avoid redundant description, detailed descriptions thereof are omitted.

Some embodiments of the present disclosure are described in detail above with reference to the accompanying drawings. However, the present disclosure is not limited to the specific details in the foregoing embodiments, many simple variations can be made to the technical solutions of the present disclosure within the scope of the technical concept of the present disclosure, which all fall within the protection scope of this disclosure.

For example, the various specific technical features described in the above specific embodiments can be combined in any suitable manner without contradiction. In order to avoid unnecessary repetition, various possible combinations will not be described in the present disclosure.

For another example, various different implementations of this disclosure can also be combined arbitrarily, as long as they do not violate the idea of this disclosure, which should also be regarded as the content disclosed in this disclosure.

It should be understood that in various method embodiments of the present disclosure, the sequence numbers of the above-mentioned processes do not mean the performing order, and the performing order of the processes should be determined according to the functions and the internal logic thereof, and should not be limit the implementations of the embodiments of the present disclosure.

The cell selection methods according to the embodiments of the present disclosure have been described above in detail. Communication devices according to the embodiments of the present disclosure will be described below in conjunction with FIG. 7 to FIG. 9. The technical features described in the method embodiments are applicable to the following device embodiments.

Figure 7:
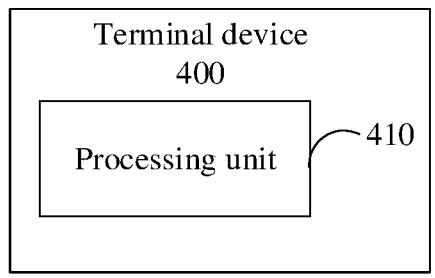
FIG. 7 is a schematic block diagram of a terminal device according to an embodiment of the present disclosure.

FIG. 7 is a schematic block diagram of a terminal device 400 according to an embodiment of the present disclosure. As shown in FIG. 7, the terminal device 400 includes a processing unit 410 configured to obtain an identifier of at least one cell and/or at least one frequency point corresponding to a network type supported by the terminal device.

The processing unit 410 is further configured to determine a target cell for cell selection or cell reselection according to the identifier of the at least one cell and/or the at least one frequency point.

Optionally, in an embodiment of the present disclosure, the network type is a closed access group CAG network and/or a stand-alone non-public network SNPN network.

Optionally, in an embodiment of the present disclosure, the identifier of the at least one cell and/or the at least one frequency point is an identifier of the CAG network; and/or the identifier of the at least one cell and/or the at least one frequency point is an identifier of the SNPN network.

Optionally, in an embodiment of the present disclosure, the identifier of the CAG network and/or the identifier of the SNPN network is at least one of the following: a Public Land Mobile Network PLMN and CAG identifier; a PLMN and Network Identity MD identifier; and indication for indicating the identifier of the CAG network.

The identifier of the SNPN network is at least one of the following: a PLMN and SNPN identifier, a PLMN and network ID (NID) identifier, and indication for indicating the identifier of the SNPN network.

Optionally, in an embodiment of the present disclosure, the processing unit 410 is specifically configured to obtain the identifier of the at least one cell and/or the at least one frequency point that has been accessed in history and/or that has been attempted to access in history.

Optionally, in an embodiment of the present disclosure, the processing unit 410 is specifically configured to search for the at least one cell and/or the at least one frequency point; and if a cell/cells is/are found by searching and an identifier/identifiers of at least part of the found cell/cells matches cell identifiers in a list of allowed network type identifiers, determine a cell hat is successfully matched as a first target cell.

Optionally, in an embodiment of the present disclosure, the processing unit 410 is specifically configured to match the identifier of the at least one cell and/or the identifier of the at least one frequency with identifiers of allowed cells and/or frequency points; search for the cells and/or frequency points that are successfully matched; and determine the cell found by searching as the first target cell.

Optionally, in an embodiment of the present disclosure, the processing unit 410 is specifically configured to obtain the identifier of the at least one cell and/or the identifier of the at least one frequency point through system information.

Optionally, in an embodiment of the present disclosure, the system information includes at least one of the following information: an index of the at least one frequency point, a PCI range corresponding to the at least one frequency point, at least one PCI identifier corresponding to the at least one frequency point, the identifier of the at least one cell and the identifier of the at least one frequency point.

Optionally, in an embodiment of the present disclosure, the processing unit 410 is specifically configured to sequentially search for the at least one cell according to ranking of signal strength of the at least one cell; and if cells are found by searching and the identifiers of at least part of the found cells match cell identifiers in a list of allowed network type identifiers, determine a cell that is successfully matched as a second target cell.

Optionally, in an embodiment of the present disclosure, the processing unit 410 is specifically configured to determine a cell search range according to a PCI range or at least one PCI identifier in the system information if a cell with strongest signal strength in the at least one cell is not the target cell; and determine a cell that is successfully matched as the second target cell if cells are found by searching in the cell search range and the identifiers of at least part of the found cells match cell identifiers in a list of allowed network type identifiers.

Optionally, in an embodiment of the present disclosure, the processing unit 410 is specifically configured to determine a third target cell according to a priority order of priority of the at least one frequency point and priority of a frequency point of a currently camped-on cell and according to the identifier of the at least one cell and/or the at least one frequency point.

Optionally, in an embodiment of the disclosure, the processing unit 410 is specifically configured to select a number of N cells with strongest signal strength from cells on a target frequency point of the at least one frequency point if the priority of the target frequency point is equal to the priority of the frequency point of the currently camped-on cell, where N is a positive integer; and match the identifiers of the cells in the N cells with the cell identifiers in the list of allowed network type identifiers; and determine the cell that is successfully matched as the third target cell.

Optionally, in an embodiment of the disclosure, the processing unit 410 is specifically configured to match identifiers of cells on a target frequency point in the at least one frequency point with cell identifiers in a list of allowed network type identifiers if the priority of the target frequency point is equal to the priority of the frequency point of the currently camped-on cell; and select a third target cell from successfully matched cells according to signal strength of the successfully matched cells.

Optionally, in an embodiment of the present disclosure, the processing unit 410 is specifically configured to if the priority of a target frequency point in the at least one frequency point is higher than or equal to the priority of the frequency point of the currently camped-on cell, determine a cell on the target frequency point whose signal strength is greater than a threshold and whose cell identifier matches a cell identifier in a list of allowed network type identifiers, as the third target cell.

Optionally, in an embodiment of the present disclosure, the processing unit 410 is specifically configured to when the priority of a target frequency point in the at least one frequency is lower than the priority of the frequency point of the currently camped-on cell and the signal strength of the currently camped-on cell is less than a threshold, determine a cell on the target frequency point, the signal strength of which is greater than the threshold and the cell identifier of which matches a cell identifier in a list of allowed network type identifiers, as the third target cell.

Optionally, in an embodiment of the present disclosure, the terminal device 400 further includes a communication unit 420, configured to receive redirection information, where the redirection information is used to indicate the identifier of the at least one cell and/or the identifier of the at least one frequency point.

Optionally, in an embodiment of the present disclosure, the redirection information includes at least one of the following identifiers: an index of the at least one frequency point, a PCI identifier corresponding to each frequency point in the at least one frequency point, the identifier of the at least one cell, and the identifier of the at least one frequency point.

Optionally, in an embodiment of the present disclosure, the processing unit 410 is specifically configured to search the PCI corresponding to each frequency point in the at least one frequency point; if cells are found by searching on the PCI corresponding to each frequency point and the identifiers of at least part of the found cells match the cell identifiers in a list of allowed network type identifiers, determine a cell that is successfully matched as a fourth target cell.

Optionally, in an embodiment of the present disclosure, the processing unit 410 is specifically configured to search for each of cells on each frequency point in the at least one frequency point; if a cell is found by searching and the identifier of the found cell matches a cell identifier in the list of allowed network type identifiers, determine the cell that is successfully matched as the fourth target cell.

Optionally, in an embodiment of the disclosure, the terminal device 400 further includes a communication unit 420, configured to receive cell reselection priority information, where the cell reselection priority information is used to indicate the identifier of the at least one cell and/or the identifier of the at least one frequency point.

Optionally, in an embodiment of the present disclosure, the cell reselection priority information includes an index of the at least one frequency point, a PCI identifier corresponding to each frequency point in the at least one frequency point, and the identifier of the at least one cell and the identifier of the at least one frequency point.

Optionally, in an embodiment of the present disclosure, the processing unit 410 is specifically configured to search the PCI corresponding to each frequency point in the at least one frequency point; if cells are found by searching on the PCI corresponding to each frequency point, the found cells meet a cell reselection rule, and the identifiers of at least part of the found cells match the cell identifiers in the list of allowed network type identifiers, determine a cell that is successfully matched as the third target cell.

Optionally, in an embodiment of the present disclosure, the processing unit 410 is specifically configured to search for each of cells on each frequency point in the at least one frequency point; if a cell is found by searching, the found cell meets a cell reselection rule, and the identifier of the found cell matches a cell identifier in the list of allowed network type identifiers, determine the successfully matched cell as the third target cell.

Optionally, in an embodiment of the present disclosure, the cell reselection priority information further includes priority of each frequency point in the at least one frequency point.

Optionally, in an embodiment of the present disclosure, the processing unit 410 is specifically configured to determine a first target cell according to the identifier of the at least one cell and/or the identifier of the at least one frequency point; in a case that the first target cell is not determined, determine a second target cell according to the identifier of the at least one cell and/or the identifier of the at least one frequency point; in a case that the second target cell is not determined, perform cell reselection to determine a third target cell according to the identifier of the at least one cell and/or the identifier of the at least one frequency point.

Optionally, in an embodiment of the present disclosure, before determining the first target cell according to the identifier of the at least one cell and/or the identifier of the at least one frequency point, the processing unit 410 is further configured to determine a fourth target cell according to the identifier of the at least one cell and/or the identifier of at least one frequency point; and the processing unit 410 is specifically configured to determine the first target cell according to the identifier of the at least one cell and/or the identifier of the at least one frequency point in a case that the fourth target cell is not determined.

It should be understood that the terminal device 400 may correspond to the terminal device in the method 200, and can implement the corresponding operations of the terminal device in the method 200, which will not be repeated here for the sake of brevity.

Figure 8:
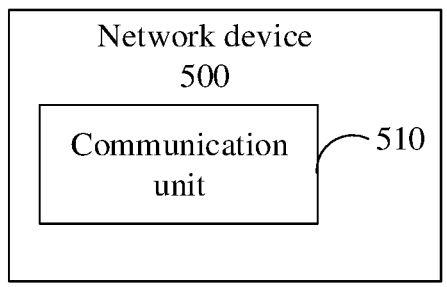
FIG. 8 is a schematic block diagram of a network device according to an embodiment of the present disclosure.

FIG. 8 is a schematic block diagram of a network device 500 according to an embodiment of the present disclosure. As shown in FIG. 8, the network device 500 includes a communication unit 510 configured to send first information to a terminal device, where the first information is used to indicate an identifier of at least one cell and/or at least one frequency point corresponding to a network type supported by the terminal device.

Optionally, in an embodiment of the present disclosure, the network type is a closed access group CAG network and/or a stand-alone non-public network SNPN network.

Optionally, in an embodiment of the present disclosure, the identifier of the at least one cell and/or the at least one frequency point is an identifier of the CAG network; and/or the identifier of the at least one cell and/or the at least one frequency point is an identifier of the SNPN network.

Optionally, in an embodiment of the disclosure, the identifier of the CAG network and/or the identifier of the SNPN network is at least one of the following: a Public Land Mobile Network PLMN and CAG identifier; and a PLMN and Network Identity NID identifier.

The identifier of the SNPN network is at least one of the following: a PLMN and SNPN identifier, a PLMN and Network ID (NID) identifier, and indication for indicating the identifier of the SNPN network.

Optionally, in an embodiment of the present disclosure, the first information is system information.

Optionally, in an embodiment of the present disclosure, the system information includes at least one of the following information: an index of the at least one frequency point, a Physical Cell Identity PCI range corresponding to the at least one frequency point, at least one PCI identifier corresponding to the at least one frequency point, the identifier of the at least one cell and the identifier of the at least one frequency point.

Optionally, in an embodiment of the present disclosure, the first information is redirection information.

Optionally, in an embodiment of the present disclosure, the first information is cell reselection priority information.

Optionally, in an embodiment of the present disclosure, the cell reselection priority information further includes priority of each frequency point in the at least one frequency point.

Optionally, in an embodiment of the present disclosure, the first information includes at least one of the following identifiers: an index of the at least one frequency point, a PCI identifier corresponding to each frequency point in the at least one frequency point, the identifier of the at least one cell, and the identifier of the at least one frequency point.

Optionally, in an embodiment of the present disclosure, the communication unit 520 is specifically configured to send system information to the terminal device; and send cell reselection priority information to the terminal device in a case that the terminal device fails to determine the second target cell.

Optionally, in an embodiment of the present disclosure, before sending the system information to the terminal device, the communication unit 520 is further configured to send redirection information to the terminal device; and the communication unit 520 is specifically configured to send the system information to the terminal device when the terminal device fails to determine the fourth target cell.

It should be understood that the network device 500 may correspond to the network device in the method 300, and can implement the corresponding operations of the network device in the method 300, which will not be repeated here for the sake of brevity.

Figure 9:
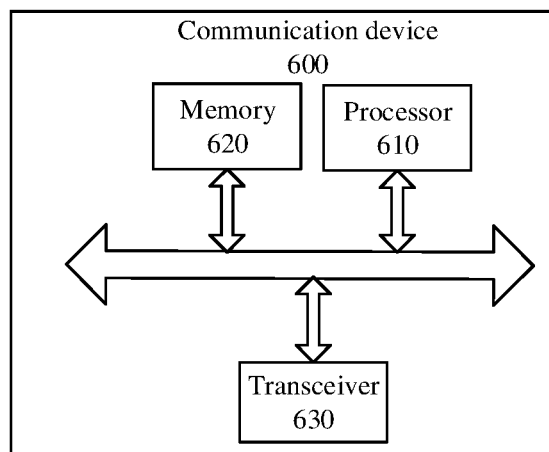
FIG. 9 is a schematic block diagram of a communication device according to an embodiment of the present disclosure.

FIG. 9 is a schematic structural diagram of a communication device 600 according to an embodiment of the present disclosure. The communication device 600 shown in FIG. 9 includes a processor 610. The processor 610 can call and execute a computer program from a memory to carry out the methods in the embodiments of the present disclosure.

Optionally, as shown in FIG. 9, the communication device 600 can further include a memory 620. The processor 610 can call and run the computer program from the memory 620 to carry out the methods in the embodiments of the present disclosure.

The memory 620 can be a separate device independent of the processor 610, or can be integrated in the processor 610.

Optionally, as shown in FIG. 9, the communication device 600 can further include a transceiver 630, and the processor 610 can control the transceiver 630 to communicate with other devices, and specifically, to transmit information or data to other devices, or to receive information or data transmitted from other devices.

The transceiver 630 can include a transmitter and a receiver. The transceiver 630 can further include an antenna, and the number of the antennas can be one or more.

Optionally, the communication device 600 can specifically be the network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can specifically be the terminal device in the embodiments of the present disclosure, and the communication device 600 can carry out the corresponding processes which are implemented by the terminal device in the methods of the embodiments of the present disclosure, which will not be repeated here for the sake of brevity.

Figure 10:
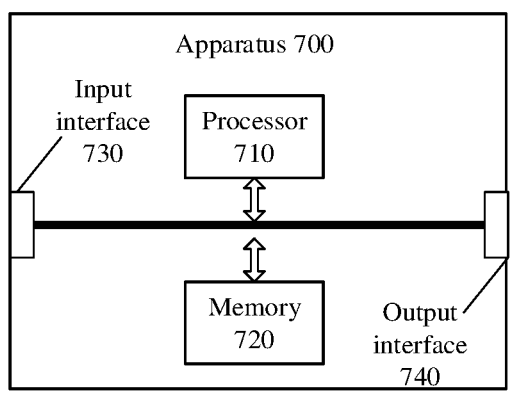
FIG. 10 is a schematic block diagram of an apparatus according to an embodiment of the present disclosure.

FIG. 10 is a schematic structural diagram of an apparatus according to an embodiment of the present disclosure. The apparatus 700 shown in FIG. 10 includes a processor 710 which can call and run a computer program from a memory to carry out the methods in the embodiments of the present disclosure.

Optionally, as shown in FIG. 10, the apparatus 700 can further include a memory 720. The processor 710 can call and run the computer program from the memory 720 to carry out the methods in the embodiments of the present disclosure.

The memory 720 can be a separate device independent of the processor 710, or can be integrated in the processor 710.

Optionally, the apparatus 700 can further include an input interface 730. The processor 710 can control the input interface 730 to communicate with other devices or chips, and specifically, to obtain information or data transmitted by other devices or chips.

Optionally, the apparatus 700 can further include an output interface 740. The processor 710 can control the output interface 740 to communicate with other devices or chips, and specifically, to output information or data to other devices or chips.

Optionally, the apparatus can be applied to the terminal device in the embodiments of the present disclosure, and the apparatus can carry out the corresponding processes which are implemented by the terminal device in the methods of the embodiments of the present disclosure, which will not be repeated here for the sake of brevity.

Optionally, the apparatus can be applied to the network device in the embodiments of the present disclosure, and the apparatus can carry out the corresponding processes which are implemented by the network device in the methods of the embodiments of the present disclosure, which will not be repeated here for the sake of brevity.

Optionally, the apparatus 800 may be a chip. It should be understood that the chip mentioned in the embodiment of the present disclosure may also be referred to as a system-level chip, a system chip, a chip system, a system-on-chip, or the like.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the terminal device in the embodiments of the present disclosure, and the computer program causes the computer to perform the corresponding processes which are implemented by the terminal device in the methods of the embodiments of the present disclosure, which will not be repeated here for the sake of brevity.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

An embodiment of the present disclosure also provides a computer program product including computer program instructions.

Optionally, the computer program product can be applied to the terminal device in the embodiments of the present disclosure, and the computer program instructions cause a computer to perform the corresponding processes which are implemented by the terminal device in the methods of the embodiments of the present disclosure. For the sake of brevity, a repetition will be omitted here.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

An embodiment of the disclosure also provides a computer program.

Optionally, the computer program can be applied to the terminal device in the embodiments of the present disclosure, and when running on a computer, the computer program causes the computer to perform the corresponding processes implemented by the terminal device in the methods according to the embodiments of the present disclosure, which will not be repeated here for the sake of brevity.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for cell selection, comprising:
    obtaining, by a terminal device, an identifier of at least one cell corresponding to a network type supported by the terminal device; and
    determining, by the terminal device according to the identifier of the at least one cell, a target cell for cell selection or cell reselection,
    wherein the network type is a Closed Access Group (CAG) network,
    wherein the identifier of the at least one cell is an identifier of the CAG network, and
    wherein the terminal device obtains the identifier of at least one cell according to saved information, and the save information comprises an index of at least one frequency point, and a Physical Cell Identity (PCI) range corresponding to the at least one frequency point.

2. The method according to claim 1, wherein the obtaining, by the terminal device, the identifier of the at least one cell corresponding to the network type supported by the terminal device comprises:
    obtaining, by the terminal device, an identifier of at least one cell that the terminal device has accessed in history.

3. The method according to claim 1, wherein the identifier of the CAG network is:
    a Public Land Mobile Network (PLMN) and CAG identifier.

4. A terminal device, comprising:
    a processor; and
    a memory for storing a computer program,
    wherein the processor is configured to call and run the computer program stored in the memory,
    wherein the processor is configured to obtain an identifier of at least one cell corresponding to a network type supported by the terminal device,
    wherein the processor is further configured to determine a target cell for cell selection or cell reselection according to the identifier of the at least one cell,
    wherein the network type is a Closed Access Group (CAG) network,
    wherein the identifier of the at least one cell is an identifier of the CAG network, and
    wherein the terminal device obtains the identifier of at least one cell according to saved information, and the save information comprises an index of at least one frequency point, and a Physical Cell Identity (PCI) range corresponding to the at least one frequency point.

5. The terminal device according to claim 4, wherein the processor is configured to:
    obtain an identifier of at least one cell that the terminal device has accessed in history.

6. The terminal device according to claim 4, wherein the identifier of the CAG network is a Public Land Mobile Network PLMN and CAG identifier.

7. A network device, comprising:
    a transceiver;
    a processor; and
    a memory for storing a computer program,
    wherein the processor is configured to call and run the computer program stored in the memory,
    the transceiver is configured to send first information to a terminal device, wherein the first information is used to indicate an identifier of at least one cell corresponding to a network type supported by the terminal device,
    wherein the network type is a Closed Access Group (CAG) network,
    wherein the identifier of the at least one cell is an identifier of the CAG network, and
    wherein the terminal device obtains the identifier of at least one cell according to saved information, and the save information comprises an index of at least one frequency point, and a Physical Cell Identity (PCI) range corresponding to the at least one frequency point.

8. The network device according to claim 7, wherein the identifier of the CAG network is a Public Land Mobile Network (PLMN) and CAG identifier.

* * * * *